Patented Mar. 22, 1927.

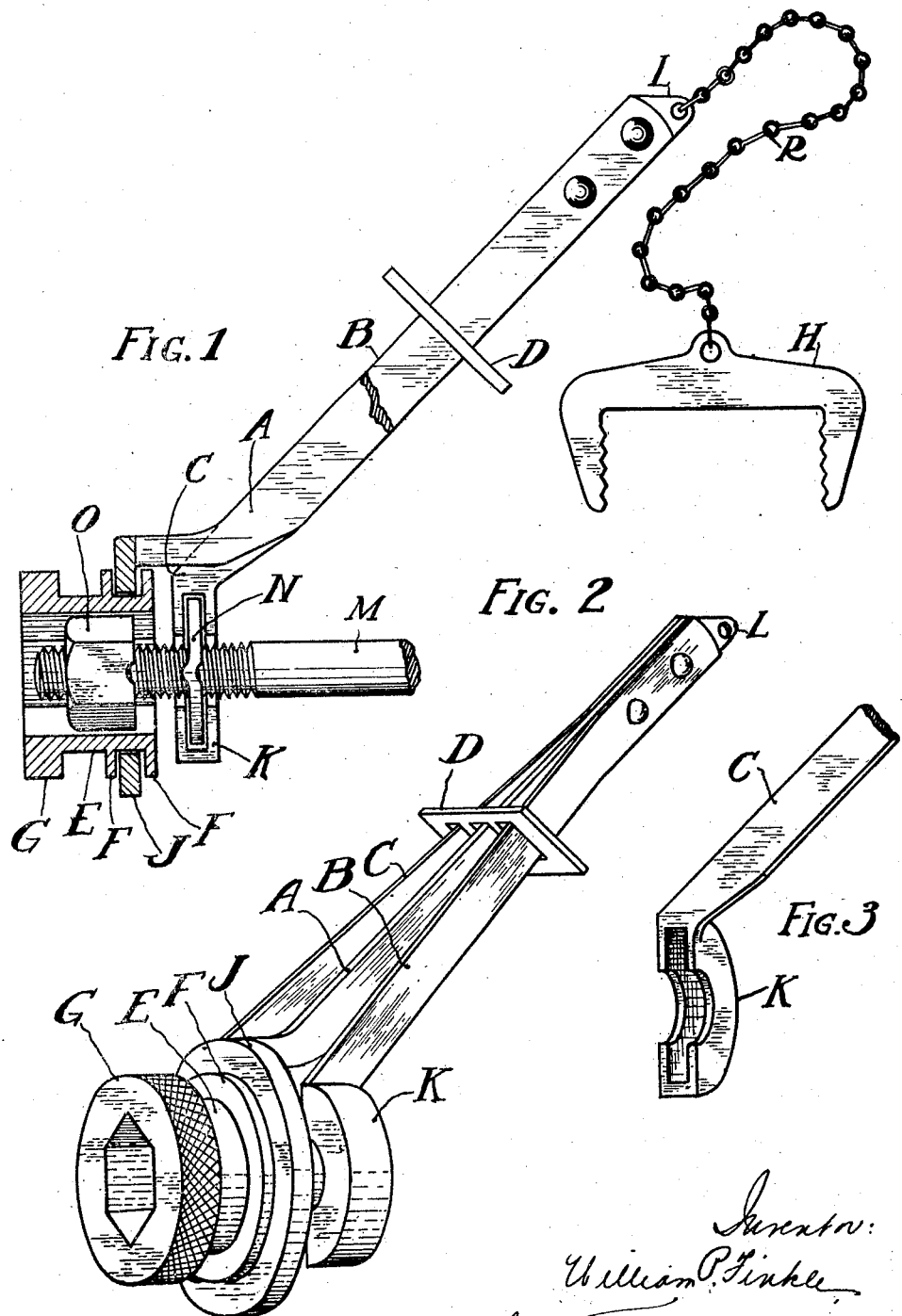

1,622,192

UNITED STATES PATENT OFFICE.

WILLIAM P. FINKLE, OF CASTLETON-ON-HUDSON, NEW YORK, ASSIGNOR OF ONE-HALF TO HENRY A. BAILEY, OF BURLINGTON, VERMONT.

TOOL.

Application filed March 9, 1926. Serial No. 93,523.

This invention relates to tools, and the invention has reference particularly to a device for applying and adjusting nuts and washers and a band clamp of transmissions on a well known type of automobile.

It is an object of this invention to provide a band clamp which is effective to hold the band in position while another part of the equipment is employed for holding a washer and a nut while the same are being positioned in operative relation to a bolt which is intended to secure the band; the said device having novel means for holding a washer and a novel rotatable means associated therewith for turning the nut and threading it on or off the said bolt.

It is a further object of this invention to produce a washer and nut holder, the former of which has sections which are expansible or movable with relation to each other in order that the washer may be inserted between them, the said device having means also which are effective to clamp the sections in operative relation to the washer for holding it while the device is manipulated.

It is a still further object of this invention to produce an equipment of the character stated which is simple in its construction and comparatively inexpensive.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation partly in section of an equipment embodying the invention;

Figure 2 illustrates a perspective view of that part of the device intended to hold the washer and nut; and Figure 3 illustrates a perspective view of one of the nut embracing elements with the handle thereof broken away.

In the present embodiment of the invention, arms A, B and C have portions which lie parallel at or near their outer ends and the said arms are secured together in any appropriate way, as by rivets. A sliding clamp D has apertures to receive the several arms and the said clamp is slidable on the arms and it is operative to draw the arms B and C inwardly toward the arm A when the clamp is moved toward the free ends of the arms. A wrench socket E is provided with circumferential flanges FF in spaced relation to each other, and a circumferential rib G at the end of the socket opposite the flanges FF, and the said rib is preferably roughened or knurled in order that the socket may be manipulated and rotated for adjusting a nut, as will presently appear.

The equipment includes a band clamp H which is intended to hold the band while the band is secured in the usual manner. The arm A has a ring or loop J which preferably extends at an angle to the arm embraces or encircles the socket and it lies in the groove or space between the flanges FF, it being, of course, obvious that the socket may rotate in the ring or loop, but it will be prevented from having any perceptible axial movement, and it is the purpose of the inventor that the joint between the socket and ring shall be sufficiently loose to permit free rotation of the socket without any substantial movement axially.

The arms B and C have oppositely curved housings K on their free ends which preferably extend at angles to the said arms B and C and when the clamping plate D is moved toward the housings, they are forced together toward a bolt M in order that a washer N may be held between or in the housings in alinement with a nut O located in the wrench socket. The arms B and C are resilient, and when the clamp is moved in a direction away from the housings, the arms B and C will separate and clear the washer in order that the equipment may be moved from operative position with relation to the nut.

The arm A preferably projects beyond the ends of the arms B and C as at L, and the extended end is apertured in order that a flexible element such as a chain R may be anchored to it and connected to the clamp H, it being understood, of course, that the connection R shall be of a length to permit the clamp to be positioned on the band while free movement is afforded for manipulating the washer holder and the nut socket.

As will be apparent from an inspection of the drawing and from the foregoing description, the transmission clamp may be held by the clamp H, and after a washer has been applied to the housings and the plate D is moved to force the housings into engagement with the washer, a nut may be inserted in the wrench socket and thereafter the washer and nut may be inserted in a transmission case and manipulated to cause the washer to pass over the end of the nut O until the nut is at the end of the bolt M. By rotating the wrench socket, the nut will be caused to be threaded on the bolt, and by releasing the arms B and C and permitting them to separate, the housings will clear the edge of the washer and permit the nut to be forced against the said washer, whereas rotation of the socket in the opposite direction will serve to remove the nut.

I claim:

1. In a washer and nut manipulating tool, an arm having a ring at one end, a wrench socket having peripheral flanges in spaced relation to each other between which the ring is seated, said wrench socket being rotatable in the ring, resilient elements at the sides of the said arm having means for holding a washer with its aperture in alinement with the aperture of a nut in the wrench socket, means for holding the parts in operative positions, and a band clamp associated with the said arm and resilient elements.

2. In a washer and nut manipulating tool, an arm having an angularly disposed end, a socket rotatable therein, an arm on each side of the first mentioned arm, each of the second mentioned arms having angularly disposed ends with sockets in the facing edges thereof adapted for receiving a washer and holding it in alinement with the socket, and means for retaining the second mentioned arms in adjusted relation to the first mentioned arm and retaining the washer while the socket is being manipulated.

WILLIAM P. FINKLE.